US006928462B2

(12) United States Patent
Jia

(10) Patent No.: US 6,928,462 B2
(45) Date of Patent: Aug. 9, 2005

(54) SYSTEM AND METHOD FOR DISTRIBUTED PROCESSING OF NON-PROCESSABLE ELEMENTS OF A DOCUMENT TO BE RENDERED ON A CLIENT

(75) Inventor: Charles Chi Jia, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 760 days.

(21) Appl. No.: 09/799,381

(22) Filed: Mar. 6, 2001

(65) Prior Publication Data

US 2002/0129097 A1 Sep. 12, 2002

(51) Int. Cl.[7] ............................................. G06F 15/16
(52) U.S. Cl. ...................... 709/203; 709/202; 709/217; 709/229; 709/246
(58) Field of Search ................................. 709/200–203, 709/217–219, 223–226, 229, 238–240, 245–246; 713/200–201

(56) References Cited

U.S. PATENT DOCUMENTS

| 5,420,967 | A | 5/1995 | Delp ........................... 345/646 |
| 5,502,458 | A | 3/1996 | Braudaway et al. ........ 345/593 |
| 5,838,906 | A | 11/1998 | Doyle et al. ................. 709/202 |
| 6,134,598 | A | 10/2000 | Raman ........................ 709/246 |
| 6,167,441 | A | 12/2000 | Himmel ...................... 709/246 |
| 6,182,224 | B1 * | 1/2001 | Phillips et al. ............... 709/229 |
| 6,345,303 | B1 * | 2/2002 | Knauerhase et al. ........ 709/238 |
| 6,353,892 | B2 * | 3/2002 | Schreiber et al. ........... 713/201 |
| 6,421,733 | B1 * | 7/2002 | Tso et al. .................... 709/246 |
| 6,430,609 | B1 * | 8/2002 | Dewhurst et al. ........... 709/223 |

FOREIGN PATENT DOCUMENTS

WO    WO98/43178    10/1998

OTHER PUBLICATIONS

Ma Wei–Ying et al., "Framework for adaptive content delivery in herterogeneous network environments", Hewlett–Packard Laboratories, Jan. 24, 2000, pp. 1–14.
European Search Report for European Patent Application No. EP02251454, completed on Nov. 25, 2004 (based on on priority U.S. Appl. No.: 09/799,381).

* cited by examiner

*Primary Examiner*—Bharat Barot

(57) ABSTRACT

Various systems and methods are disclosed to achieve remote processing of items in a client with limited processing capacity. Specifically, a client receives an element that it is unable to render or otherwise process to present to the user due to its limited processing capacity. The client transmits the element to a server that includes various processing modules that allow the server to process the element or otherwise perform the task that was beyond the client capability. The server thus processes the element, thereby converting it into a form that is recognizable by the client. The processed element is then sent back to the client where it is depicted or otherwise executed in the client.

36 Claims, 8 Drawing Sheets

```xml
<?xml version="1.0" encoding="UTF-8"?>
<request>
    <unitModel>HP PSC 955</unitModel>  ← 203
    <unitType>APPLIANCE</unitType>  ← 206
    <unitId>120098345</unitId>  ← 209
    <serviceInfo>
        <requestId>200106150066</requestId>  ← 213
        <requestSubId>0</requestSubId>  ← 216
        <requestType>Raster</ requestType>
        <requestLevel>0</requestLevel>
    </serviceInfo>
    <elementInfo>  ← 219
        <element>http://www.hp.com/reinvent.jpeg</element>
        <elementType>Image</elementType>  ← 223
        <Moreelements>false</Moreelements>
    </elementInfo>
    <processingInfo>  ← 226
        <destinationFormat>RASTER</destinationFormat>
        <imageWidth>400</imageWidth>
        <imageHeight>300</imageHeight>
        <datapacked>YES</datapacked>               ⎫ 229
        <compressed>NO</compressed>
        <allowPackets>YES</allowPackets>
        <allowResident>NO</allowResident>          ⎭
    </processingInfo>
    <deviceInfo>
        <MaxSheetLength>11</MaxSheetLength>        ⎫
        <MaxSheetWidth >8.5</MaxSheetWidth>        ⎬ 233
        <Units>inches</Units>                      ⎭
    </deviceInfo>
</request>
```

```xml
<?xml version="1.0"?>
<scpd xmlns="urn:schemas-upnp-org:service-1-0">
    <specVersion>
        <major>1</major>
        <minor>0</minor>
    </specVersion>
    <unitmodel>HP PSC 955</unitmodel>    ←—203
    <requestStateTable>
        <stateVariable sendEvents="no">
            <name>State</name>
            <dataType>string</dataType>
            <defaultValue>Idle</defaultValue>
            <allowedValueList>
                <allowedValue>Idle</allowedValue>
  323 {         <allowedValue>Sending</allowedValue>
                <allowedValue>Receiving</allowedValue>
                <allowedValue>Rejected</allowedValue>
                <allowedValue>Errored</allowedValue>
            </allowedValueList>
        </stateVariable>
        <stateVariable sendEvents="yes">
            <name>MoreObjects</name>
            <dataType>boolean</dataType>
            <defaultValue>false</defaultValue>
  323 {     <allowedValueList>
                <allowedValue>true</allowedValue>
                <allowedValue>false</allowedValue>
            </allowedValueList>
        </stateVariable>
        <stateVariable sendEvents="no">
            <name>MaxSheetLength</name>
  323 {     <dataType>ui4</dataType>
            <defaultValue>VendorSpecificValue</defaultValue>
        </stateVariable>
        <stateVariable sendEvents="no">
            <name>MaxSheetWidth</name>
  323 {     <dataType>ui4</dataType>
            <defaultValue>VendorSpecificValue</defaultValue>
        </stateVariable>
        <stateVariable sendEvents="no">
            <name>Units</name>
            <dataType>string</dataType>
            <defaultValue>inches</defaultValue>
            <allowedValueList>
                <allowedValue>inches</allowedValue>
  323 {         <allowedValue>inches/10</allowedValue>
                <allowedValue>inches/100</allowedValue>
                <allowedValue>inches/1000</allowedValue>
                <allowedValue>mm</allowedValue>
                <allowedValue>mm/10</allowedValue>
            </allowedValueList>
        </stateVariable>
        ...Declarations for other state variables here...
    </requestStateTable>
</scpd>
```

FIG. 5  179a

```xml
<?xml version="1.0"?>
<scpd xmlns="urn:schemas-upnp-org:service-1-0">
    <specVersion>
        <major>1</major>
        <minor>0</minor>
    </specVersion>
    <unitmodel>HP PSC 955</unitmodel>
    <actionList>
        <action>
            <name>SendConfiguration</name>
            <argumentList>
                <argument>
          326 ⎰  <name>Name</name>
              ⎱  <direction>in</direction>
                  <relatedStateVariable>Name</relatedStateVariable>
                </argument>
                <argument>
          326 ⎰  <name>Resolution</name>
              ⎱  <direction>in</direction>
                  <relatedStateVariable>A_ARG_TYPE_UI4</relatedStateVariable>
                </argument>
                <argument>
          326 ⎰  <name>ImageWidth</name>
              ⎱  <direction>in</direction>
                  <relatedStateVariable>A_ARG_TYPE_UI4</relatedStateVariable>
                </argument>
                <argument>
          326 ⎰  <name>ImageHeight</name>
              ⎱  <direction>in</direction>
                  <relatedStateVariable>A_ARG_TYPE_UI4</relatedStateVariable>
                </argument>
                <argument>
          326 ⎰  <name>ImageFormat</name>
              ⎱  <direction>in</direction>
                  <relatedStateVariable>ImageFormat</relatedStateVariable>
                </argument>
            </argumentList>
        </action>
    </actionList>
</scpd>
```

```
<?xml version="1.0">
<response>
        <unitModel>HP PSC 955</unitModel>  ← 203
        <unitType>APPLIANCE</unitType>  ← 206
        <unitId>120098345</unitId>
        <serviceInfo>
                <requestId>200106150066</requestId> ← 213
                <requestSubId>0</requestSubId> ← 216
                <requestType>Raster</requestType>
                <requestLevel>0</requestLevel>
        </serviceInfo>
        <responseinfo>
                <responseID>243536354634<responseID>
                <responsesubID>0</responsesubID>
                <morepackets>false</morepackets>
        </responseinfo>
        <processedelementInfo>   ⟵ 329
                <element>...processed element here...</element>
                <format>raster</format>
        </processedelementInfo>
</response>
```

SYSTEM AND METHOD FOR DISTRIBUTED PROCESSING OF NON-PROCESSABLE ELEMENTS OF A DOCUMENT TO BE RENDERED ON A CLIENT

TECHNICAL FIELD

The present invention is generally related to the field of processing and, more particularly, is related to a system and method for distributed processing between a client and a server.

BACKGROUND OF THE INVENTION

Current data communications networks such as the Internet or other networks has sparked the information age. As time goes by, more and more information is made available via the Internet. Also, as more and more individuals gain access to existing data communications networks, an increased use of electronic mail is evident. The advent of the digital revolution, and specifically, the Internet has changed the lives of nearly everyone in some manner. Unfortunately, there are those who are left out. In particular, many individuals are not "computer literate" and lack the skills to use a personal computer or other available computing device that provide access to the Internet and the information that it provides. Also, the current cost of computer technology necessary to gain access to the Internet places such technology beyond the reach of many who cannot afford it.

In an attempt to address these problems, new devices termed "Internet Appliances" provide easy to use limited Internet access capability are being created. These devices are designed to provide limited access to the Internet without the use of a personal computer or equivalent system. Due to their limited capability, Internet appliances may be made available to consumers at a lower cost than traditional computer technology. The limited capability of such devices is manifested, for example, in terms of limited processing power or other attributes. These devices may include mini-browsers that provide limited access to information from various sites on the Internet or other network. Unfortunately, the limits in the processing power of Internet appliances may limit the functionality below an acceptable threshold that seriously effects their marketability.

SUMMARY OF THE INVENTION

In view of the foregoing discussion, the present invention provides for various systems and methods for remote processing. In one embodiment, a processing method is provided in a server. In this respect, the processing method comprises the steps of parsing a processing request in a server to identify a non-processable element associated therewith, the processing request being received from a client via a network, wherein the non-processable element is unrecognizable by the client, and, performing at least one processing task on the non-processable element to generate a processed element recognizable by the client.

In another embodiment, the present invention provides for a program embodied on a computer readable medium for remote processing. In this respect, the program includes at least one statement for parsing a processing request in a server to identify a non-processable element associated therewith, where the processing request was received from a client via a network and the non-processable element is unrecognizable by the client. Also, the computer program includes at least one statement for initiating an execution of at least one processing task on the non-processable element to generate a processed element recognizable by the client.

In yet another embodiment, the present invention provides for a remote processing system. In this respect, the remote processing system includes a processor circuit having a processor and a memory. Stored in the memory and executable by the processor is remote processing logic. The remote processing logic comprises logic for parsing a processing request in a server to identify a non-processable element associated therewith. The processing request is received from a client via a network, where the non-processable element is unrecognizable by the client. The remote processing logic also comprises logic for initiating an execution of at least one processing task on the non-processable element to generate a processed element recognizable by the client.

On the client side, the present invention provides for a method for interfacing with a processing server to achieve the remote processing of incompatible elements received by the client. In this regard, the present method comprises parsing a markup file in the client to ascertain a non-processable element associated therewith, the markup file being received from a server via a network; generating a processing request and associating the non-processable element therewith; and transmitting the processing request to the processing server to be transformed into a processed element recognizable by the client.

The present invention also provides for a program embodied on a computer readable medium and executable in a client for interfacing with a processing server. In this respect, the program comprises at least one statement for parsing a markup file in a client to ascertain a non-processable element associated therewith, the markup file being received from a server via a network; at least one statement for generating a processing request and associating the non-processable element therewith; and at least one statement for transmitting the processing request to the processing server to be transformed into a processed element recognizable by the client.

The present invention also provides for a system in a client for interfacing with a processing server. In this regard, the system includes a processor circuit having a processor and a memory. Stored in the memory and executable by the processor is processing compatibility logic. The processing compatibility logic comprises logic for parsing a markup file in the client to ascertain a non-processable element associated therewith, the markup file being received from a server via a network. The processing compatibility logic also comprises logic for generating a processing request and associating the non-processable element therewith, and, logic for transmitting the processing request to the processing server to be transformed into a processed element recognizable by the client.

Other features and advantages of the present invention will become apparent to a person with ordinary skill in the art in view of the following drawings and detailed description. It is intended that all such additional features and advantages be included herein within the scope of the present invention.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

FIG. 2 is a sample of a processing request generated by a client of the distributed processing network of FIG. 1;

FIG. 5 is a sample of a client specification sheet stored, for example, in a server of the distributed processing network of FIG. 1;

FIG. 6 is a sample of a client configuration stored, for example, in a server of the distributed processing network of FIG. 1;

FIG. 7 is a sample of a processing response generated by a server of the distributed processing network of FIG. 1.

DETAILED DESCRIPTION OF THE INVENTION

Figure 1:
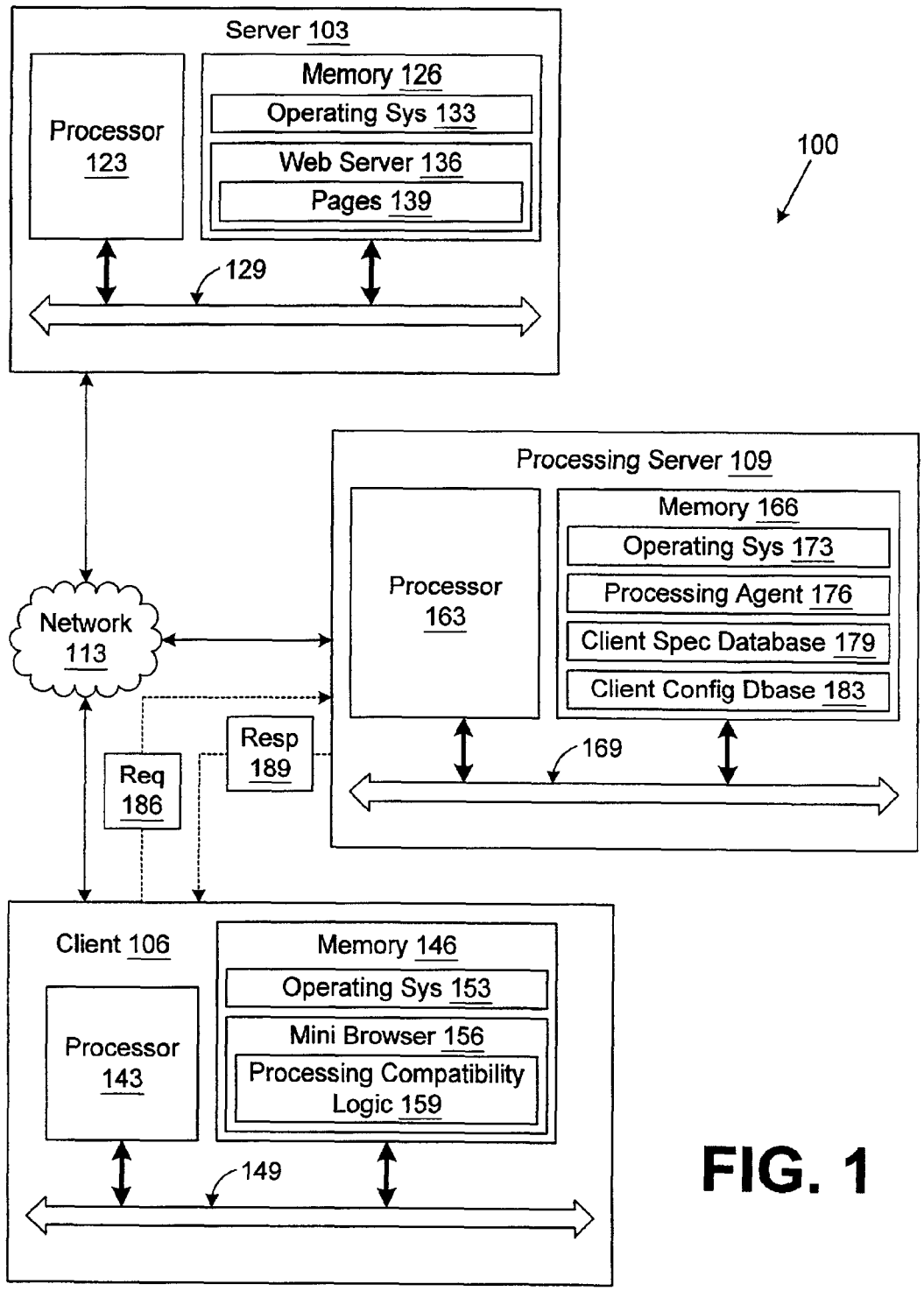
FIG. 1 is a drawing of a distributed processing network according to the present invention.

Turning to FIG. 1, shown is a distributed processing network 100 according to the present invention. The distributed processing network 100 includes a server 103, a client 106, and a processing server 109. The server 103, client 106, and processing server 109 are all coupled to a network 113. The server 103, client 106, and processing server 109 are in data communication with each other by way of the network 113.

The server 103 includes a processor circuit with a processor 123 and a memory 126, both of which are coupled to a local interface 129. The local interface may be, for example, a data bus with an accompanying control bus as is generally known by those with ordinary skill in the art. Stored in the memory 126 and executable by the processor 123 is an operating system 133 and a web server 136. The web server 136 includes a number of pages 139. The pages 139 may be created using hypertext markup language (HTML), extensible markup language (XML), or other computer language that is accessed and interpreted by browsers as is known by those with ordinary skill in the art. The web server 136 may operate according to the protocol employed by the world wide web or according to another protocol to accomplish the transfer of the pages 139 to other machines coupled to the network 113 as is generally known by those with ordinary skill in the art. The server 103 is representative of a multitude of servers that contain pages 139 that may be accessed and viewed/manipulated with the client 106.

The client 106 may be, for example, an Internet Appliance such as an Internet capable printer/scanner, a personal digital assistant (PDA), palm pilot, or other device. Note that the client 106 may be compatible with other networks beyond the Internet. In this respect the client 106 includes a processor circuit with a processor 143 and a memory 146, both of which are coupled to a local interface 149. The local interface 149 may be, for example, a data bus with an accompanying control bus as is generally known by those with ordinary skill in the art. Stored in the memory 146 and executable by the processor 143 is an operating system 153 and a mini-browser 156. The mini browser 153 includes processing compatibility logic 159 according to an aspect of the present invention. The client 106 may include user input devices such as, for example, a keypad, touch pad, touch screen, microphone, or one or more push buttons, etc. Also, the client 106 may include user output devices such as display devices, indicator lights, etc. Such input/output devices provide the user with the ability to manipulate the client 106 in an appropriate manner.

The processing server 109 also includes a processor circuit with a processor 163 and memory 166, both of which are coupled to a local interface 169. The local interface 169 may be, for example, a data bus with an accompanying control bus as is generally known by those with ordinary skill in the art. Stored on the memory 166 and executable by the processor 163 is an operating system 173, a processing agent 176, a client specification database 179, and a client configuration database 183. The processing agent 176 is executed by the processor 163 to perform various processing tasks in conjunction with the requirements of the client 106 and the server 103 as will be discussed. The client specification database 179 and the client configuration database 183 are accessed by the processing agent 176 as needed.

In addition, each of the memories 126,166, and 146 include both volatile and nonvolatile memory components. Volatile components are those that do not retain data values upon loss of power. Nonvolatile components are those that retain data upon a loss of power. Thus, the memories 126, 166, and 146 may comprise, for example, random access memory (RAM), read-only memory (ROM), hard disk drives, floppy disks accessed via an associated floppy disk drive, compact disks accessed via a compact disk drive, magnetic tapes accessed via an appropriate tape drive, and/or other memory components, or a combination of any two or more of these memory components.

Also, each of the processors 123, 143, and 163 may represent multiple processors and each of the memories 126, 166, and 146 may represent multiple memories that operate in parallel processing circuits, respectively. In such a case, the local interface 129, 149, and 169 may be an appropriate network that facilitates communication between any two of the multiple processors or between any processor and any of the memories, etc. The local interface 129, 149, and 169 may facilitate memory to memory communication as well. The processors 123/146/163, memories 126/166/146, and local interfaces 129/149/169 may be electrical or optical in nature. Also, the memories 126/166/146 may be magnetic in nature.

The network 113 includes, for example, the Internet, wide area networks (WANs), local area networks, or other suitable networks, etc., or any combination of two or more such networks. The server 103, client 106, and/or processing server 109 are coupled to the network 113 in any number of ways to facilitate data communication to and from the network 113 as is generally known by those of ordinary skill in the art. For example, the server 103, client 106, and/or processing server 109 may be linked to the network 113 through various devices such as, for example, network cards, modems, or other such communications devices.

The server 103 and/or the processing server 109 may each employ one or more peripheral devices. Such peripheral devices may include user input devices, for example, a keypad, touch pad, touch screen, microphone, scanner, mouse, joystick, or one or more push buttons, etc. Also, the peripheral devices may include user output devices such as display devices, indicator lights, speakers, printers, etc. Specific display devices may be, for example, cathode ray tubes (CRT), a liquid crystal display screens, a gas plasma-based flat panel displays, light emitting diodes, etc.

The operating systems 133, 153, and 173 are executed to control the allocation and usage of hardware resources in the server 103, client 106, and the processing server 109, respectively. Specifically, the operating systems 133, 153, and 173 control the allocation and usage of the respective memories 126, 146, and 166, processing time, and the peripheral devices as well as performing other functionality. In this manner, the operating systems 133, 153, and 173 serve as the foundation on which applications depend as is generally known by those with ordinary skill in the art.

Next, the operation of the distributed processing network 100 is described. To begin, a user manipulates the mini-browser 156 in the client 106 to download one of the pages 139 from the server 103. Alternatively, one or more of the pages 139 may be automatically download from the server 103 to the client 106, the pages 139 having been pre-selected, etc. The processor 143 in the client 106 is limited in the number of instructions it can execute within a given period of time, thereby limiting the size and complexity of the components stored on the memory 146 that can be executed in an acceptable manner. Thus, the min-browser 156 is employed by the client 106 as it requires a lesser amount of processing power to execute.

Due to the fact that the client 106 includes a diminished processing capacity, when a respective one of the pages 139 is downloaded to the client 106, the mini-browser 156 may not be able to process and render all of the information contained within the page 139 for a user. As a result, the client 106 may render an incomplete depiction of the pages 139. For example, assuming that the client 106 were a Internet capable scanner/printer, then the mini-browser 156 or the operating system 153 may lack the functionality necessary to convert various images or text from the formats included in the pages 139 into a format recognizable by the client such as a raster format for printing. Consequently, a printout of the respective page 139 by the client 106 may not include various components that could not be rendered by the client 106.

To address this situation, the mini-browser 156 includes the processing compatibility logic 159. The processing compatibility logic 159 is executed by the processor 143 to scan over a newly received page 139 to identify any non-processable elements within the page 139. The non-processable elements are those that are unrecognizable by the client 106 insofar as the client 106 does not have the ability to process such elements. The processing compatibility logic 159 then generates a processing request 186 and associates the non-processable element therewith. The processing compatibility logic 159 then supplies the processing request 186 to the processing server 109. The processing server 109 executes the processing agent 176 to parse through the processing request 186 to determine one or more processing tasks that need to be implemented in light of the non-processable element to convert it into a form that is recognizable by the client 106.

The processing agent 176 examines a client specification sheet stored in the client specification database 179 to obtain information necessary to identify the processing tasks necessary to perform the conversion into the format that is acceptable by the client 106. The processing agent then proceeds to perform the one or more processing tasks to convert the non-processable element into a "processable" element that can be processed by the client 106.

The processing agent 176 then generates a processing response 189 that has the processable element associated therewith. The processing agent 176 also associates the processing response 189 with the processing request 186. This may be done, for example, by including a request identifier supplied in the processing request 186 into the processing response 189. Thereafter, the processing server 109 transmits the processing response 189 back to the client 106. The client 106 then obtains the processable element from the processing response 189 and renders the element for the user in the form for which the client 106 is adapted.

With reference to FIG. 2, shown is a processing request 186 according to an aspect of the present invention. The processing request is generated by the processing compatibility logic 159 upon identifying a non-processable element within a page 139 (FIG. 1) that has been downloaded from the server 103 (FIG. 1) to the client 106 (FIG. 1). The processing request 186 identifies a number of items that provide information to the processing agent 176 (FIG. 1) that enable the processing of the non-processable element. For example, the processing request 186 includes a unit model 203, a unit type 206, and a unit serial number 209. The unit model 203, unit type 206, and unit serial number 209 identify the particular hardware configuration of the client 106. The processing request 186 also includes a request identifier 213 to uniquely identify the processing request 186 among any number of requests generated by the client 106 at a given moment. The processing server 109 (FIG. 1) copies the request identifier 213 to the processing response 189 (FIG. 1) to associate the processing response 189 with the particular processing request 186.

The processing request 186 also includes a subdivision identifier 216 that uniquely identifies a particular processing request 186 among a grouping of processing requests 186. The subdivision identifier 216 facilitates the case that a particular non-processable element is transmitted to the processing server 109 in multiple processing requests 186. The processing requests 186 may be created using various computer languages or formats such as, for example, HTML, XML, or other suitable language or format.

Associated with the processing request 186 is a non-processable element 219 as well as an element type 223. The non-processable element 219 may be associated with the processing request 186, for example, by including a uniform resource indicator (URI) of the non-processable element 219 therein. Such a URI locates the non-processable element 219 on the network 113. Also, the non-processable element 219 may be associated with the processing request 186 by including the data that comprises the non-processable element itself into the processing request 186. The image type 223 indicates a particular type of the non-processable element 219, for example, such as whether it is an image, text, etc.

The processing request 186 also includes processing information such as a destination format 226 with a number of destination parameters 229 that relate to the capabilities of the client 106. The destination format 226 indicates a desired format to which the non-processable element is to be converted so as to be compatible with the capabilities of the client. The parameters 229 may identify that data compression may be employed or that the processed element may be received in a form of packets, etc. The processing request 186 also includes physical output information 133 relating to the client 106 that indicates a particular physical output format associated with the client 106. For example, the output information 233 may be a paper size that is employed to print out the resulting processed element or other information. In addition, it is understood that other information may be included within the processing request 186 other than that discussed above to provide the processing server 109 with the capability of processing the unprocessed element 219 contained therein.

Figure 3A:
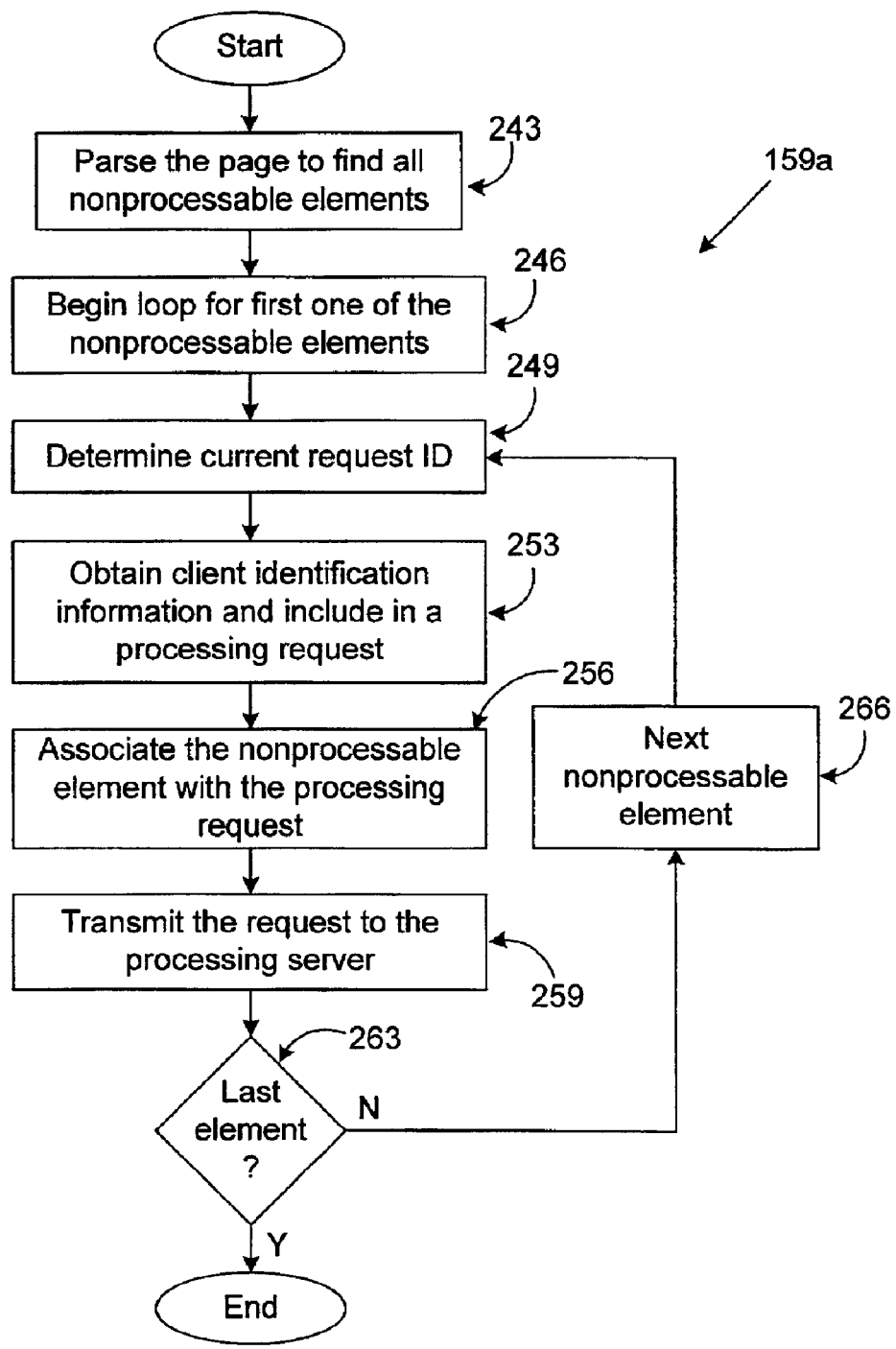
FIG. 3A is a flow chart of a first component of processing compatibility logic executed in a client of the distributed processing network of FIG. 1.

With reference to FIG. 3A, shown is a flow chart of a first component of the processing compatibility logic 159*a* according to an aspect of the present invention. Alternatively, the flow chart of FIG. 3A may be viewed as depicting the steps in a method executed in the client 106. The processing compatibility logic 159*a* may be created using any one of a number of software languages such as Java™ by Sun Microsystems of Mountainview, Calif.; C++; ANSI C that is a version of C language standardized by the American National Standards Institute, although other languages may be employed.

The processing compatibility logic 159*a* is executed in the client 106 to identify all non-processable elements 219 (FIG. 2) within one of the pages 139 (FIG. 1) downloaded from the server 103 (FIG. 1) to the client 106 (FIG. 1). The processing compatibility logic 159*a* also generates the processing request 186 (FIG. 1) that is transmitted to the processing server 109 (FIG. 1). This is done to allow the non-processable element 219 contained therein to be processed by the processing agent 176 (FIG. 1), thereby converting the non-processable element 219 into the destination format 226 that is compatible with the client 106. Beginning with block 243, the processing compatibility logic 159*a* parses through the page 139 to find all of the non-processable elements 219 contained therein. In particular, the non-processable elements 219 are those that are incompatible with the client 106 such that the client 106 lacks the capability of rendering the non-processable elements in the most optimal form to the user.

After all of the non-processable elements are identified in block 243, then the processing compatibility logic 159*a* proceeds to block 246 to begin a loop with the first one of the non-processable elements 219 identified in block 243. Thereafter, in block 249 a request identifier 213 (FIG. 2) is generated by the processing compatibility logic 159*a*. Next, in block 253 the client identification information is included in the processing request 186, namely, the unit model 203 (FIG. 2), unit type 206 (FIG. 2), the serial number 209 (FIG. 2), the processing information including the destination format 226 and the parameters 229, and the device information 233 as well as any other pertinent information. The processing compatibility logic 159*a* then proceeds to block 256 in which the non-processable element 219 is associated with the processing request 186.

Thereafter, the processing compatibility logic 159*a* progresses to block 259 in which the processing request 186 is transmitted to the processing server 109 (FIG. 1) to be processed by the processing agent 176. Note that encryption, encapsulation, or other date processing may be applied to the processing request 186 as well. Then, in block 263 the processing compatibility logic 159*a* determines whether the last non-processable element 219 identified in the respective page 139 (FIG. 1) has been transmitted in a processing request 186 to the processing server 109. If not, then the processing compatibility logic 159*a* moves to block 266 in which the next non-processable element 219 is identified. Thereafter, the processing compatibility logic 159*a* reverts to block 249. Referring back to block 263, assuming that the last non-processable element 219 has been transmitted to the processing server 109, then the processing compatibility logic 159*a* ends accordingly.

Figure 3B:
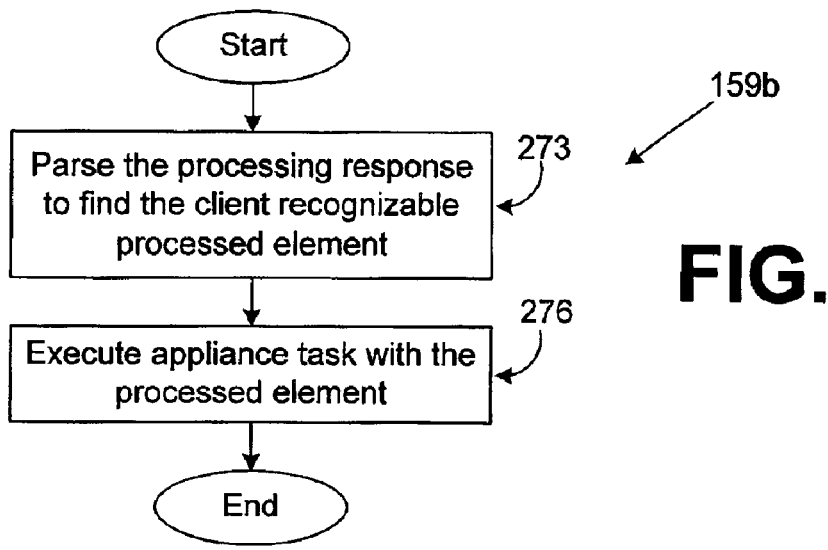
FIG. 3B is a flow chart of a second component of processing compatibility logic executed in a client of the distributed processing network of FIG. 1.

With reference to FIG. 3B, shown is a flow chart of a second component of the processing compatibility logic 159*b* according to an aspect of the present invention. Alternatively, the flow chart of FIG. 3B may also be viewed as depicting the steps in a method executed in the client 106. The processing compatibility logic 159*b* is executed in the client 106 upon the receipt of the processing response 189 (FIG. 1) from the processing server 109. In this respect, the processing compatibility logic 159*b* begins with block 273 in which the processing response 189 is parsed to find the processed element that is associated therewith. Thereafter, the processing compatibility logic 159*b* proceeds to block 276 in which an appliance task is executed in the client 106 that employs the processed element. For example, in the case that the client 106 is an Internet capable printer/scanner, then the processed element may be included within a document that is to be printed, etc. Thereafter, the processing compatibility logic 159*b* ends to await the arrival of the next processing response 189.

Figure 4:
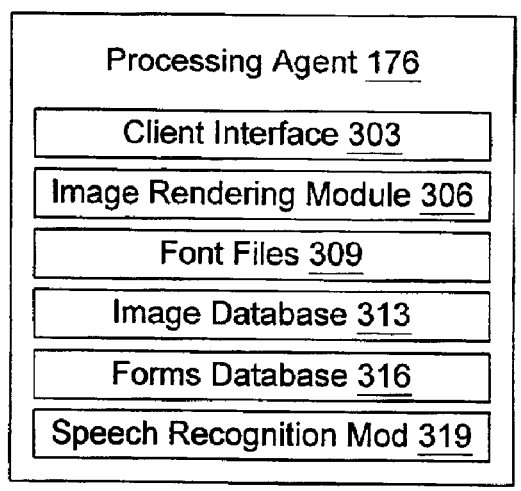
FIG. 4 is a block diagram of a processing agent executed in a server of the distributed processing network of FIG. 1.

With reference to FIG. 4, shown is a block diagram of the processing agent 176 according to an aspect of the present invention. The processing agent 176 includes a client interface 303 and several other components that are employed by the processing agent 176 to perform various processing tasks to generate the processed element that is transmitted back to the client 106 (FIG. 1). In this respect, the processing agent 176 includes one or more image rendering modules 306, various font files 309, image databases 313, forms databases 316, speech recognition modules 319 or other modules that perform various processing tasks. It is understood that the processing agent 176 is not limited to a particular type of processing task as any number of different processing tasks may be employed to convert a non-processable element 219 into a processed element that is compatible with the client 106 given its limited processing capability.

The various processing tasks performed by the modules within the processing agent 176 can vary from converting an image to a particular format that is compatible with the client 106 to generating various images and forms with files stored in the image and forms databases 313 and 316. Also, font files 309 may be consulted to render various fonts that are not contained within the client 106. The speech recognition module 319 may be employed to convert a voice signal into text that is understandable by the client 106. The use of the processing agent 176 to perform various processing tasks that are beyond the capability of the client 106 provides various advantages. For instance, one such advantage is that the processor circuit within the client 106 need not perform all of the tasks necessary to provide an output. Specifically, assuming that the client 106 were an Internet capable printer, for example, then the client 106 would not need to be outfitted with all of the various processing modules needed to render every type of image, font, or other printable element that the client may encounter 106. Rather, such processing modules may be included in the processing agent 109.

To provide another example, assume that the client 106 includes a microphone that a user may employ to provide verbal operational commands to the client 106 to perform various tasks. In response, the client 106 transmits the recorded voice signal in the form of an MP3 file, for example, to the processing server 109 (FIG. 1) to obtain the text equivalent of the voice signal. The processing server 109 may then download the text commands to the client 106 that recognizes the format and performs the desired action. Thus, the various kinds of processing tasks that may be performed by the processing agent 176 are generally unlimited depending on desired results with the client 106 of limited capability.

As another example, the client 106 may transmit text to the processing server 109. The processing agent 176 would then generate an audio file that corresponds to the transmitted text. This audio file may then be sent back to the client 106 where it is played for a user. This would be beneficial for the blind who could obtain audio readout of various text that is scanned using a scanner. There is a multitude of possible applications to which the present invention may be directed, such applications being within the scope of the present invention.

With reference to FIG. 5, shown is a client specification sheet 179a that is stored in the client specification database 179 (FIG. 1) of the processing server 109 (FIG. 1) the client specification sheet 179a declares various state variables relative to the particular client 106 to which the client specification sheet 179a is associated. In particular, the client specification sheet 179a includes the unit model 203 that associates the client 106 with the client specification sheet 179a. The client specification sheet 179a declares a number of state variables 323 that are consulted by the processing agent 176 in performing various processing tasks that are specific to a particular client 106.

With reference to FIG. 6, shown is a client configuration sheet 183a that is stored within the client configuration database 183 (FIG. 1). The client interface 303 (FIG. 4) consults the client configuration sheet 183 to determine a configuration of the processing response to be transmitted to the client 106 (FIG. 1). In particular, the client configuration sheet 183a identifies a number of variables 326 that are consulted in creating the processing response. The variables may include the name of the element, resolution if the element is an image, image width, image height, image format, compression factor, an image type, a pixel type, a color space, a time-out value, or other parameters. By knowing these parameters, the client interface 303 may determine the precise processing tasks that are to be performed to generate the processed element for the client 106.

Turning then to FIG. 7, shown is the processing response 189 according to an aspect of the present invention. The processing response 189 includes the unit model 203, unit type, 206, and unit identifier 209. The unit identifier 209 may be, for example, a unique serial number assigned to the client 106 (FIG. 1). This information may be employed by the processing agent 176 (FIG. 1) to verify that a particular processing request 186 was received from a valid client 106. Also, the request identifier 213 and the subdivision identifier 216 are included that associate the processing response 189 with the respective processing request 183. Associated with the processing response 189 is a processed element 329. In particular, the processed element 329 may be associated with the processing response 189, for example, by including the actual data that is encompassed within the processed element into the processing response 189. Alternatively, processed element 329 may be associated with the processing response 189 by including a uniform resource identifier (URI) of the processed element on the network 113 (FIG. 1) in the processing response 189.

Figure 8:
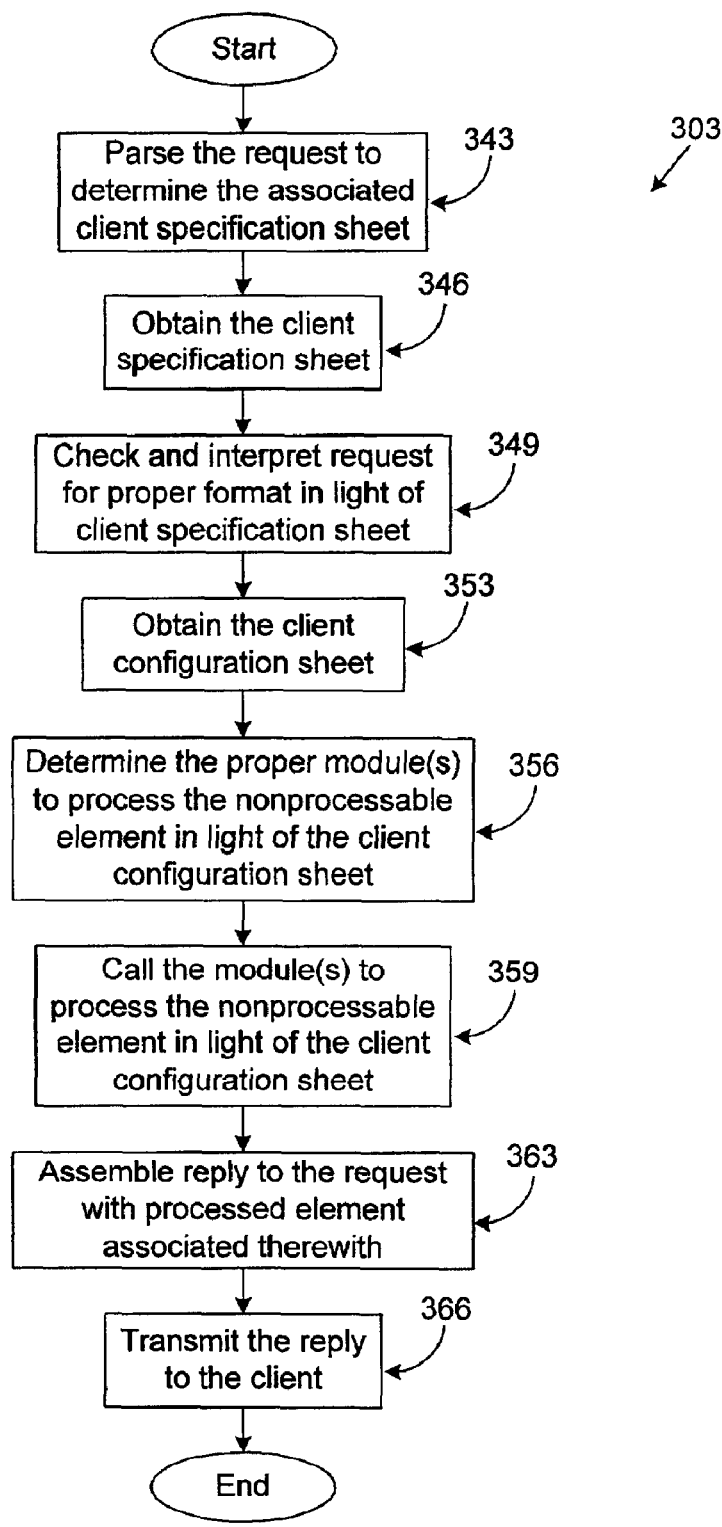
FIG. 8 is a flow chart of processing compatibility logic executed in a client of the distributed processing network of FIG. 1.

With reference to FIG. 8, shown is a flow chart of the client interface 303 executed as part of the processing agent 176. Alternatively, the flow chart of FIG. 8 may viewed as depicting steps in a method for processing the processing request 189 (FIG. 7). The client interface 303 is executed in the processing server 109 as a part of the processing agent 176 to interpret a processing request 186 received from the client 106. The client interface 303 then initiates the execution of the various processing tasks necessary to convert the unprocessed element 219 into a processed element 329 (FIG. 7) compatible with the client 106.

The client interface 303 and other components of the processing agent 176 may be created using various programming languages including Java from Sun Microsystems™ and C++. Also, various aspects of the processing agent 176 and the client interface 303 in particular may be written as Common Gateway Interface script, JavaScript, Active Server Pages (ASP), and/or other appropriate programming languages. Beginning with block 343, the client interface 303 parses the received processing request to determine the associated client specification sheet 179a (FIG. 5). This may be done by obtaining the unit model 203 (FIG. 5) of the client 106 (FIG. 1) from the processing request 186 (FIG. 2) and matching the same information in the corresponding client specification sheet 179a.

Thereafter the client interface 303 moves to block 346 in which the client specification sheet 179 is obtained from the client specification database 179. Thereafter the client interface 303 proceeds to block 349 in which the processing request is checked to ensure that it is in proper format in light of the client specification sheet 179a. Also, the various parameters identified by the processing request 186 are examined to determine which of the modules in the processing agent 176 are to be executed to process the nonprocessable item 219. Then, in block 353 the client interface 303 obtains the client configuration sheet 183a from the client configuration database 183 (FIG. 1).

Next, the client interface 303 proceeds to block 356 in which the proper modules to be executed to process the nonprocessable element 219 are determined in light of the client configuration sheet 183a. Then, in block 359, appropriate calls are made to the modules to process the nonprocessable element 219. Thereafter, in block 363, the processing reply 189 (FIG. 7) is assembled and the processed element is included therein. Finally, in block 366 the processing reply 189 is transmitted to the client 106. Thereafter the client interface 303 ends until it is reinitiated for the next processing request 186.

Although the processing compatibility logic 159 and/or the processing agent 176, etc., of the present invention are embodied in software executed by general purpose hardware as discussed above, as an alternative the same may also be embodied in dedicated hardware or a combination of software/general purpose hardware and dedicated hardware. If embodied in dedicated hardware, for example, the processing compatibility logic 159 and/or the processing agent 176 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow charts of FIGS. 3A, 3B, and 8 show the architecture, functionality, and operation of an implementation of the processing compatibility logic 159 and the processing agent 176. If embodied in software, each block may represent a module, segment, or portion of code that comprises one or more action statements in the form of executable instructions or declarations to implement the specified logical function(s). If embodied in hardware, each block may represent a circuit or a number of interconnected circuits to implement the specified logical function(s). Although the flow charts of FIGS. 3A, 3B, and 8 show a specific order of execution, it is understood that the order of execution may differ from that which is depicted. For example, the order of execution of two or more blocks may be scrambled relative to the order shown. Also, two or more blocks shown in succession in FIGS. 3A, 3B, and 8 may be executed concurrently or with partial concurrence. It is understood that all such variations are within the scope of the present invention. Also, the flow charts of FIGS. 3A, 3B, and 8 are relatively self-explanatory and are understood by those with ordinary skill in the art to the extent that software and/or hardware can be created by one with ordinary skill in the art to carry out the various logical functions as described herein.

Also, the processing compatibility logic 159 and/or the processing agent 176 can be embodied in any computer-readable medium for use by or in connection with an instruction execution system such as a computer/processor based system or other system that can fetch or obtain the logic from the computer-readable medium and execute the instructions or action statements contained therein. In the context of this document, a "computer-readable medium" can be any medium that can contain, store, or maintain the processing compatibility logic 159 and/or the processing agent 176 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, a portable magnetic computer diskette such as floppy diskettes or hard drives, a random access memory (RAM), a read-only memory (ROM), an erasable programmable read-only memory, or a portable compact disc.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

What is claimed is:

1. A processing method in a server, comprising:
    parsing a processing request in a server to identify a non-processable element of a document to be rendered on a client, the non-processable element being associated with the processing request, and the processing request being received from the client via a network, wherein the client is incapable of rendering the non-processable element;
    consulting, in the server, a client configuration associated with the client to identify at least one processing task to be performed to convert the non-processable element into a processed element that can be rendered by the client; and
    performing the at least one processing task to convert the non-processable element into the processed element that can be rendered by the client.

2. The processing method of claim 1, further comprising generating a processing response to the processing request in the server, wherein the processed element is associated with the processing response.

3. The processing method of claim 1, wherein the step of performing the at least one processing task further comprises converting an image from a first format into a second format, the client being capable of rendering the image embodied in the second format.

4. The processing method of claim 2, further comprising transmitting the processing response from the server to the client via the network.

5. The processing method of claim 2, wherein the step of generating the processing response further comprises associating the processing response with the processing request.

6. The processing method of claim 5, wherein the step of associating the processing response with the processing request further comprises:
    parsing the processing request in the server to identify a request identifier; and
    including the request identifier in the processing response.

7. A program embodied on a computer readable medium for remote processing, comprising:
    at least one statement for parsing a processing request in a server to identify a non-processable element of a document to be rendered on a client, the non-processable element being associated with the processing request, and the processing request being received from the client via a network, wherein the client is incapable of rendering the non-processable element; and
    at least one statement for consulting a client configuration associated with the client to identify at least one processing task to be performed to convert the non-processable element into a processed element that can be rendered by the client;
    at east one statement for initiating an execution of the at least one processing task to convert the non-processable element into the processed element that can be rendered by the client.

8. The program embodied on a computer readable medium of claim 7, further comprising at least one statement for generating a processing response, wherein the processed element is associated therewith.

9. The program embodied on a computer readable medium of claim 8, further comprising at least one statement for transmitting the processing response from the server to the client via the network.

10. The program embodied on a computer readable medium of claim 8, wherein the at least one statement for generating the processing response further comprises at least one statement for associating the processing response with the processing request.

11. The program embodied on a computer readable medium of claim 10, wherein the at least one statement for associating the processing response with the processing request further comprises:
    at least one statement for parsing the processing request in the server to identify a request identifier; and
    at least one statement for including the request identifier in the processing response.

12. A remote processing system, comprising:
    a processor circuit having a processor and a memory;
    remote processing logic stored in the memory and executable by the processor, the remote processing logic comprising:
        logic for parsing a processing request in a server to identity a non-processable element of a document to be rendered on a client, the non-processable element being associated with the processing request, and the processing request being received from the client via a network, wherein the client is incapable of rendering the non-processable elements;
        logic for consulting a client configuration stored in the memory and associated with the client to identify at least one processing task to be performed to convert the non-processable element into a processed element that can be rendered by the client; and logic for initiating an execution of at least one processing task to convert the non-processable element into the processed element that can be rendered by the client.

13. The remote processing system of claim 12, wherein the remote processing logic further comprises logic for generating a processing response, wherein the processed element is associated therewith.

14. The remote processing system of claim 13, wherein the remote processing logic further comprises logic for transmitting the processing response from the server to the client via the network.

15. The remote processing system of claim 13, wherein the logic for generating the processing response further comprises logic for associating the processing response with the processing request.

16. The remote processing system of claim 15, wherein the logic for associating the processing response with the processing request further comprises:
    logic for parsing the processing request in the server to identify a request identifier; and
    logic for including the request identifier in the processing response.

17. A remote processing system, comprising:
    means for parsing a processing request in a server to identify a non-processable element of a document to be rendered on a client, the non-processable element being associated with the processing request, and the processing request being received from the client via a network, wherein the client is incapable of rendering the non-processable element;
    means for consulting a client configuration stored in a memory and associated with the client to identify at least one processing task to be performed to convert the non-processable element into a processed element that can be rendered by the client; and
    means for initiating an execution of at least one processing task to convert the non-processable element into the processed element that can be rendered by the client.

18. The remote processing system of claim 17, further comprising means for generating a processing response, wherein the processed element is associated therewith.

19. The remote processing system of claim 18, further comprising means for transmitting the processing response from the server to the client via the network.

20. The remote processing system of claim 18, wherein the means for generating the processing response further comprises means for associating the processing response with the processing request.

21. A method in a client for interfacing with a processing server, comprising:
    parsing a markup file in the client to ascertain a non-processable element in the markup file, the markup file embodying a document to be rendered by the client, the markup file being received from a server via a network, wherein the client is incapable of rendering the non-processable element;
    generating a processing request and associating the non-processable element therewith; and
    transmitting the processing request to the processing server to be transformed into a processed element that can be rendered by the client.

22. The method of claim 21, further comprising:
    parsing a processing response received in the client from the processing server to identify the processed element associated therewith; and
    rendering the processed element associated with the processing response in the client.

23. The method of claim 21, wherein the step of generating the processing request further comprises associating a request identifier with the processing request.

24. The method of claim 21, further comprising the step of rendering the document with the processed element embodied in the markup file in the client.

25. A program embodied on a computer readable medium for interfacing with a processing server, comprising:
    at least one statement for parsing a markup file in a client to ascertain a non-processable element in the markup file, the markup file embodying a document to be rendered by the client, the markup file being received from a server via a network, wherein the client is incapable of rendering the non-processable element;
    at least one statement for generating a processing request and associating the non-processable element therewith; and
    at least one statement for transmitting the processing request to the processing server to be transformed into a processed element that can be rendered by the client.

26. The program embodied on a computer readable medium of claim 25, further comprising:
    at least one statement for parsing a processing response received in the client from the processing server to identify the processed element associated therewith; and
    at least one statement for rendering the processed element associated with the processing response.

27. The program embodied on a computer readable medium of claim 25, wherein the at least one statement for generating the processing request further comprises at least one statement for associating a request identifier with the processing request.

28. The program embodied on the computer readable medium of claim 25, further comprising at least one statement for initiating a rendering of the document with the processed element embodied in the markup file in the client.

29. A system in a client for interfacing with a processing server, comprising:
    a processor circuit having a processor and a memory;
    processing compatibility logic stored in the memory and executable by the processor, the processing compatibility logic comprising:
        logic for parsing a markup file in the client to ascertain a non-processable element in the markup file, the markup file embodying a document to be rendered by the client, the markup file being received from a server via a network, wherein the client is incapable of rendering the non-processable element;
        logic for generating a processing request and associating the non-processable element therewith; and
        logic for transmitting the processing request to the processing server to be transformed into a processed element that can be rendered by the client.

30. The system of claim 29, wherein the processing compatibility logic further comprises:
    logic for parsing a processing response received in the client from the processing server to identify the processed element associated therewith; and
    logic for rendering the processed element associated with the processing response.

31. The system of claim 29, wherein the logic for generating the processing request further comprises logic for associating a request identifier with the processing request.

32. The system of claim 29, wherein the processing compatibility logic further comprises logic for initiating a rendering of the document with the processed element embodied in the markup file in the client.

33. A system in a client for interfacing with a processing server, comprising:

means for parsing a markup file in the client to ascertain a non-processable element in the markup file, the markup file embodying a document to be rendered by the client, the markup file being received from a server via a network, wherein the client is incapable of rendering the non-processable element;

means for generating a processing request and associating the non-processable element therewith; and means for transmitting the processing request to the processing server to be transformed into a processed element that can be rendered by the client.

34. The system of claim 33, further comprising:

means for parsing a processing response received in the client from the processing server to identify the processed element associated therewith; and means for rendering the processed element associated with the processing response.

35. The system of claim 33, wherein the means for generating the processing request and associating the non-processable element therewith further comprises means for associating a request identifier with the processing request.

36. The system of claim 33, further comprising means for initiating a rendering of the document with the processed element embodied in the markup file in the client.

* * * * *

UNITED STATES PATENT AND TRADEMARK OFFICE
CERTIFICATE OF CORRECTION

| | |
|---|---|
| PATENT NO. | : 6,928,462 B2 |
| APPLICATION NO. | : 09/799381 |
| DATED | : August 9, 2005 |
| INVENTOR(S) | : Charles Chi Jia |

Page 1 of 1

It is certified that error appears in the above-identified patent and that said Letters Patent is hereby corrected as shown below:

Column 12, Claim 12, line 62, delete "elements;" and insert therefor --element;--

Signed and Sealed this

Fifth Day of December, 2006

JON W. DUDAS
*Director of the United States Patent and Trademark Office*